(12) United States Patent
Lundstrom

(10) Patent No.: US 10,823,237 B2
(45) Date of Patent: Nov. 3, 2020

(54) CONTROLLING LUBRICATION IN A STAND-ALONE REAR AXLE DRIVE

(71) Applicant: BorgWarner Sweden AB, Landskrona (SE)

(72) Inventor: Bo Lundstrom, Glumslov (SE)

(73) Assignee: BorgWarner Sweden AB, Landskrona (SE)

( * ) Notice: Subject to any disclaimer, the term of this patent is extended or adjusted under 35 U.S.C. 154(b) by 328 days.

(21) Appl. No.: 15/775,668

(22) PCT Filed: Nov. 10, 2016

(86) PCT No.: PCT/EP2016/077370
§ 371 (c)(1),
(2) Date: May 11, 2018

(87) PCT Pub. No.: WO2017/081217
PCT Pub. Date: May 18, 2017

(65) Prior Publication Data
US 2018/0347640 A1    Dec. 6, 2018

(30) Foreign Application Priority Data
Nov. 13, 2015   (SE) ...................................... 1551470

(51) Int. Cl.
*F16D 25/12*        (2006.01)
*F16H 57/04*        (2010.01)
(Continued)

(52) U.S. Cl.
CPC ........... *F16D 25/123* (2013.01); *F16D 48/02* (2013.01); *F16D 48/066* (2013.01);
(Continued)

(58) Field of Classification Search
CPC ...... F16D 25/123; F16D 48/02; F16D 48/066; F16D 2048/029; F16D 2500/10431;
(Continued)

(56) References Cited

U.S. PATENT DOCUMENTS 3,887,037 A  *  6/1975  Haluda ............... F16H 57/0421
                                                            184/6.12
6,533,095 B2 *  3/2003  Mohan ................ F16D 25/0638
                                                            192/103 F
(Continued)

FOREIGN PATENT DOCUMENTS

CN        102168604 A      8/2011
CN        102533397 A      7/2012
(Continued)

*Primary Examiner* — Michael A Riegelman
(74) *Attorney, Agent, or Firm* — Young Basile Hanlon & MacFarlane, P.C.

(57) ABSTRACT

A rear axle drive (2) for an AWD vehicle is presented. The rear axle drive (2) is connected to an hydraulic AWD coupling (3), wherein the rear axle drive (2) comprises a lubrication valve (4) for controlling the level of lubricant in at least one lubricant reservoir (6, 7) of the rear axle drive (2) for providing lubricant to gears and/or bearings of the rear axle drive (2). The lubrication valve (4) is functionally connected to a shut-off valve (5) of the AWD coupling (3) and the lubrication valve (4) of the rear axle drive (3) is controlled by movement of an actuating member (51, 54) of the AWD coupling (3).

20 Claims, 3 Drawing Sheets

(51) Int. Cl.
*F16D 48/06* (2006.01)
*F16D 48/02* (2006.01)

(52) U.S. Cl.
CPC ... *F16H 57/0483* (2013.01); *F16D 2048/029* (2013.01); *F16D 2500/10431* (2013.01); *F16D 2500/3051* (2013.01); *F16D 2500/5118* (2013.01)

(58) Field of Classification Search
CPC ..... F16D 2500/3051; F16D 2500/5118; F16H 57/0483
See application file for complete search history.

(56) References Cited

U.S. PATENT DOCUMENTS

| | | | | |
|---|---|---|---|---|
| 6,725,989 | B1* | 4/2004 | Krisher | B60K 23/0808 192/103 F |
| 6,860,293 | B2* | 3/2005 | Douglass | F16D 25/14 137/596.17 |
| 10,119,578 | B2* | 11/2018 | Pump | F16D 48/02 |
| 2002/0078792 | A1* | 6/2002 | Kobayashi | B60K 17/02 74/665 T |
| 2002/0142879 | A1* | 10/2002 | Porter | F16H 48/22 475/221 |
| 2003/0089573 | A1* | 5/2003 | Ackermann | F16D 48/02 192/109 F |
| 2004/0159523 | A1* | 8/2004 | Duan | F16D 48/066 192/70.12 |
| 2009/0095149 | A1* | 4/2009 | Bergmann | F04B 1/20 92/13 |
| 2009/0277711 | A1* | 11/2009 | Hoffmann | B60K 23/0808 180/247 |
| 2010/0198538 | A1* | 8/2010 | Kurmaniak | F16D 48/064 702/64 |
| 2012/0031727 | A1* | 2/2012 | Nett | F16H 57/0457 192/113.1 |
| 2014/0008172 | A1* | 1/2014 | Lundstrom | F16D 48/02 192/70.12 |
| 2014/0231209 | A1* | 8/2014 | Nett | F16H 57/0483 192/85.01 |
| 2015/0330493 | A1* | 11/2015 | Pritchard | F16H 57/04 475/86 |
| 2016/0010698 | A1* | 1/2016 | Lundstrom | F16D 25/123 251/28 |
| 2016/0010706 | A1* | 1/2016 | Lundstrom | F16D 48/02 192/85.01 |
| 2016/0363180 | A1* | 12/2016 | Nilsson | F16D 48/02 |
| 2017/0002806 | A1* | 1/2017 | Lundstrom | F04B 1/34 |
| 2018/0172083 | A1* | 6/2018 | Severinsson | F16H 19/04 |
| 2018/0347640 | A1* | 12/2018 | Lundstrom | F16H 57/0483 |

FOREIGN PATENT DOCUMENTS

| | | |
|---|---|---|
| DE | 102010039447 A1 | 2/2012 |
| SE | 1350238 A1 | 8/2014 |
| WO | 2011043722 A1 | 4/2011 |
| WO | 2014133494 A1 | 9/2014 |
| WO | 2015114125 A2 | 8/2015 |

* cited by examiner

CONTROLLING LUBRICATION IN A STAND-ALONE REAR AXLE DRIVE This application claims the benefit of Swedish Application No. 1551470-6 filed Nov. 13, 2015 and PCT Application No. EP2016/077370 filed Nov. 10, 2016.

TECHNICAL FIELD

The present invention relates to rear axles and controlling lubrication in rear drive modules, more specifically controlling lubrication in rear drive modules comprising a rear axle drive and an AWD coupling, where the AWD coupling and the rear axle drive has two separate oil reservoirs and it relates to reducing churning/drag losses. The invention also relates to a method for controlling the lubrication of the rear drive module.

BACKGROUND

As is well known in the art, an AWD (All Wheel Drive) vehicle can be provided with at least one hydraulic disc coupling, i.e. an AWD coupling, for distributing the driving torque from the vehicle engine to all of the vehicle wheels. Especially, such a coupling may be provided in the driveline between the front axle and the wheels of the rear axle, most often in the vicinity of the rear axle drive.

The AWD coupling is configured to vary the amount of torque that is transferred through the clutch of the AWD coupling and thus through the rear axle drive. By being able to alternate between AWD and 2WD, the fuel consumption of the vehicle can be reduced and, when needed, traction can be improved.

The drive torque is transferred to the rear wheels via the rear axle drive, which may include a differential or other means for distributing torque. A known problem with drivelines comprising differentials or meshing gears is churning losses from interaction between moving components with the lubricant in the system. This is especially the case in drivelines for vehicles which can vary between AWD and 2WD, since the need for lubrication of the rear axle drive of the drive line varies depending on the driving mode.

It may thus be desired to control the lubrication of the rear axle drive. In addition to this there is a need for controlling the lubrication of the discs of the AWD coupling, an example of such a system can be seen for instance in WO2014/133434. The AWD coupling and the rear axle drive may not necessarily be manufactured as a single unit; in practice they may not even be manufactured by the same supplier. In these cases it would be advantageous to reduce the complexity otherwise needed for allowing reliable lubrication of the rear axle drive as well as of the AWD coupling.

SUMMARY

It is thus an object of the teachings herein to provide an improved rear drive module comprising a rear axle drive and an AWD coupling which alleviates some of the problems of prior art. This object is achieved by a concept having the features set forth in the appended independent claims; preferred embodiments thereof being defined in the related dependent claims.

In a first aspect of the teachings herein, a rear axle drive for an AWD vehicle is provided. The rear axle drive being connected to an hydraulic AWD coupling, wherein the rear axle drive comprises a lubrication valve for controlling the level of lubricant in at least one lubricant reservoir of the rear axle drive for providing lubricant to gears and/or bearings of the rear axle drive. The lubrication valve is functionally connected to a shut-off valve of the AWD coupling and the lubrication valve of the rear axle drive is controlled by movement of an actuating member of the AWD coupling. The lubrication valve thus is able to control the lubricant level in the rear axle drive to reduce churning/drag losses and provide sufficient lubrication (increase the lubricant level/flow of lubricant) when it is required, i.e. when high levels of torque is being transferred by the AWD coupling. The movement of the actuating member is preferably controlled in relation to the transferred torque through the rear axle drive.

According to one embodiment of the teachings herein, a rear axle drive is provided wherein an axially movable valve slide of the lubrication valve is provided with a transverse valve flange for cooperation with a fixed valve seat, the slide being actuatable in a closing direction by spring force and in an opening direction by a force generated by movement of the actuating member of the AWD coupling.

According to a further embodiment, a rear axle drive is provided wherein the lubrication valve of the rear axle drive is connected to the actuating member of the AWD coupling by means of a mechanical linkage. The mechanical linkage, such as a push rod, stretches from the valve slide of the lubrication valve to the actuating member.

According to a second aspect of the invention, a hydraulic AWD coupling is provided which is configured to control torque transfer through an associated rear axle drive of the first aspect, said AWD coupling having a shut-off valve, wherein the shut-off valve is functionally connected to a lubrication valve of the rear axle drive, said lubrication valve being provided for controlling the level of lubricant in at least one lubricant reservoir of the rear axle drive and for providing lubricant to gears and/or bearings of the rear axle drive, and where the lubrication of the rear axle drive is controlled by movement of an actuating member of the AWD coupling. The AWD coupling is thus configured to, in relation to the transferred torque, control lubrication of an associated rear axle drive which reduces churning/drag losses and allows lubrication to increase when necessary.

In an embodiment of the teachings herein, an AWD coupling is provided wherein the actuating member is a pressure actuated piston which is actuated by a hydraulic pressure in the AWD coupling applied for actuating the disc package and the shut off valve of the AWD coupling, said hydraulic pressure being controlled by a control unit which controls a hydraulic pump of the AWD coupling.

In one embodiment, an AWD coupling is provided wherein the actuating member is an axially moveable valve slide of the shut off valve of the AWD coupling and wherein opening movement of the valve slide of the shut off valve results in opening of the lubrication valve. Thus, the lubrication of the rear axle drive and the AWD coupling is controlled in relation to the transferred torque.

In a further embodiment, an AWD coupling is provided wherein an opening movement of the shut-off valve of the AWD coupling is actuated by a hydraulic pressure of the AWD coupling applied for actuating a disc package of the AWD coupling, said opening movement being controlled by a control unit which controls a hydraulic pump of the AWD coupling, and wherein a closing movement is actuated by spring force.

In an embodiment of the teachings herein, an AWD coupling is provided wherein the shut-off valve of the AWD coupling controls the provision of lubricant from a lubricant reservoir of the AWD coupling to a disc package of the AWD coupling.

In one embodiment, an AWD coupling is provided wherein the valve slide of the shut-off valve is provided with a transverse valve flange for cooperation with a fixed valve seat. The valve slide is actuatable in a closing direction by spring force and in an opening direction by a hydraulically operated ball having an actuation end position in a sealing ball seat.

In one embodiment, an AWD coupling is provided wherein the valve slide has a control pin for engagement with the ball.

In an embodiment of the teachings herein, an AWD coupling is provided wherein a compression spring is arranged to act on the valve slide in its axial direction.

In one embodiment, an AWD coupling is provided wherein the ball seat is arranged in a ball cage, threadingly engaged in a housing bore, in which the valve slide is arranged.

In one embodiment, an AWD coupling is provided wherein the control pin extends into the ball cage.

In one embodiment, an AWD coupling is provided wherein the ball cage is provided with a stop ring for holding the ball in the ball cage.

In one embodiment, an AWD coupling is provided wherein the ball opposite the control pin can be acted on by hydraulic pressure supplied through a housing bore.

In a third aspect of the teachings herein, a rear drive module is provided. The rear drive module is configured to distribute torque to the rear wheels of a vehicle, said rear drive module comprising a rear axle drive according to the first aspect and a thereto connected AWD coupling according to the second aspect.

In an embodiment of the teachings herein, a rear drive module is provided wherein the rear axle drive and the AWD coupling are physically separated by a housing wall and wherein the mechanical linkage stretches between the rear axle drive and the AWD coupling through a resilient membrane arranged in the said housing wall. The resilient membrane allows it to be fixedly attached to the mechanical linkage and the wall, while still allowing the linkage to move. Thus can leakage between the rear axle drive and the AWD coupling be reduced or completely avoided.

According to a fourth aspect of the invention, a method for controlling the lubrication of a rear axle drive is provided wherein the rear axle drive comprises a lubrication valve for controlling the level of lubricant in at least one lubricant reservoir of the rear axle drive for providing lubricant to gears and/or bearings of the rear axle drive, the method comprising (i) providing an AWD coupling configured to control torque transfer through the rear axle drive, the AWD coupling having a shut-off valve, and (ii) connecting the lubrication valve of the rear axle drive to an actuating member of the AWD coupling such that the supply of lubricant in the rear axle drive is controlled in response to movement of the actuating member thus functionally connecting the lubrication valve to a shut-off valve of the AWD coupling.

According to one embodiment of the invention, the shut-off valve of the AWD coupling is configured to move in relation the transferred torque by the AWD coupling wherein the method further comprises controlling the lubrication valve of the rear axle drive to provide lubrication in relation to the torque being transferred by the AWD coupling.

BRIEF DESCRIPTION OF THE DRAWINGS

Embodiments of the teachings herein will be described in further detail in the following with reference to the accompanying drawings which illustrate non-limiting examples on how the embodiments can be reduced into practice and in which.

DETAILED DESCRIPTION

Figure 1:
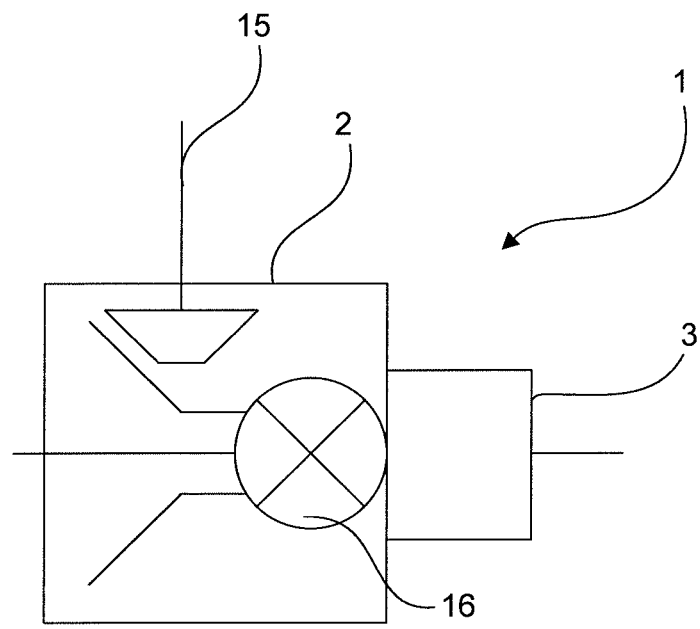
FIG. 1 shows a schematic outline of a rear drive module 1 according to one embodiment.

A drive system of an AWD (All Wheel Drive) vehicle is well known in the art. Typical examples are shown in WO2011/043722. Such a system has an engine with a control unit (ECU), a front axle with a differential, an intermediate shaft or propeller shaft 15, and a rear drive module 1. The rear drive module 1 comprises a rear axle drive 2. The rear axle drive 2 may comprise a differential 16, such as a mechanical or electrical differential or other means for distributing torque from the propeller shaft to the rear wheels of the vehicle such as clutches etc. Regardless of the type of rear axle drive 2, it typically comprises hypoid and/or differential gear sets along with bearings for supporting moving/rotating components of the drive 2 all of which requires lubrication. In order to distribute the torque not only to the front axle but also to the rear axle in accordance with the driving conditions, the rear drive module further comprises an electronically controlled wet disc coupling 3 (AWD coupling) being arranged in the driveline in proximity to the rear axle drive 2, often in the intermediate shaft or otherwise close to the rear axle drive 2. The AWD coupling may in other embodiments be arranged on one of the half shafts between the rear axle drive 2 and the rear wheels of the vehicle.

Figure 2:
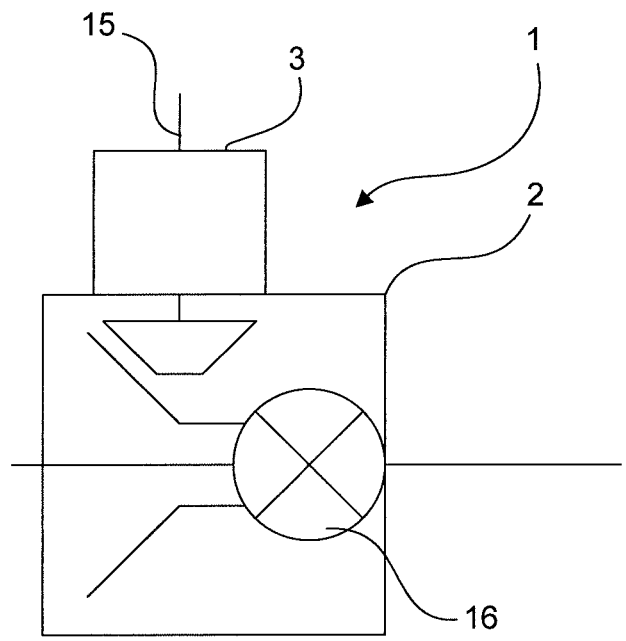
FIG. 2 shows a schematic outline of a rear drive module 1 according to one embodiment.

In FIG. 1 a functional outline of a rear drive module 1 for an AWD vehicle is shown. The propeller shaft 15 connects the engine via a power transfer unit (PTU) to the rear drive module 1 comprising an AWD coupling 3 and a rear axle drive 2 where the AWD coupling 3 is attached to the rear axle drive 2. The rear drive module 1 is connected to the rear wheels of the vehicle. The AWD coupling 3 may be attached between the rear axle drive 2 and either wheel (i.e. on one of the half axles) and/or between the rear axle drive 2 and the propeller shaft 15. In FIG. 2, a rear drive module 1 is shown where the AWD coupling 3 is placed on one end of the propeller shaft 15 in close proximity to the rear axle drive 2.

As the AWD coupling 3 of the rear drive module 1 is in a non-actuated state (which may be controlled by the ECU), no torque is being provided through the rear drive module 1 to the rear wheels of the vehicle. The AWD coupling 3 is disengaged, or non-actuated when the pressure being provided by the hydraulic pump 9 in the AWD coupling 3 is below a threshold, in this state, no torque is transmitted through the AWD coupling 3. However, even if no torque is being provided from the engine through the rear drive module 1, at least some of the gears and/or bearings of the rear axle drive will be rotating along with the rear wheels of the vehicle or with the propeller shaft 15. Therefore lubrication is still needed in the rear axle drive 2 but in a reduced amount.

It is known in the art, for example in U.S. Pat. No. 3,887,037, to provide lubricant to a rear axle drive 2, in this case a differential, by allowing at least one of the gears, preferably the ring wheel, to be partially submerged in lubricant in a reservoir or sump in the differential housing. Lubricant will thus be flung from the ring wheel during rotation and lubricant is through this mechanism distributed to all components of the differential.

Figure 3:
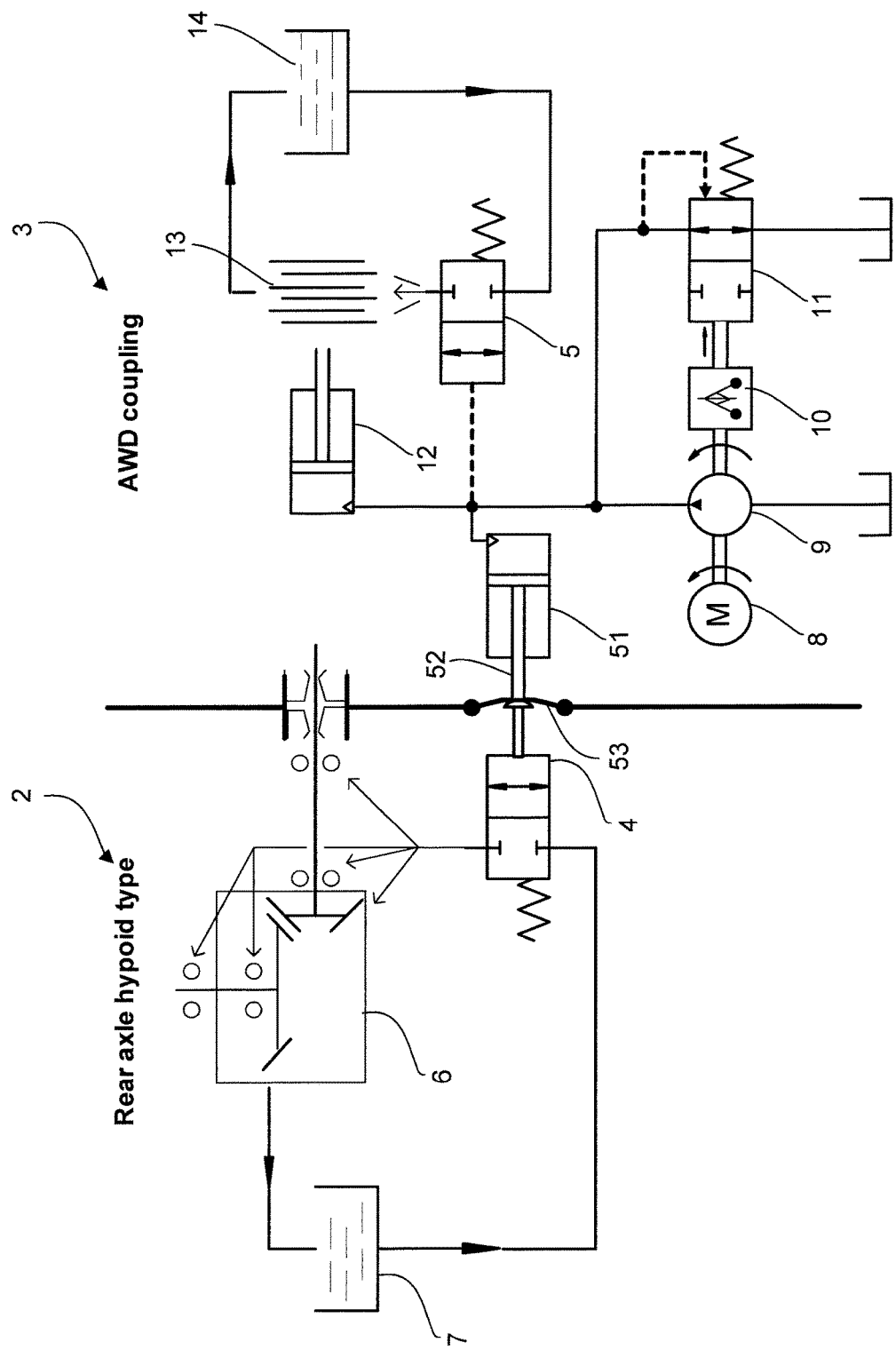
FIG. 3 shows a functional overview of a rear drive module embodiment.

Turning to FIG. 3, an overview of a rear drive module 1 comprising a rear axle drive 2 and a thereto connectable AWD coupling 3 is shown in which a lubrication valve 4 of the rear axle drive 2 is functionally connected to a shut-off valve 5 of the AWD coupling. By being functionally connected the shut off valve 5 and the lubrication valve 4 are configured to be controlled to open/close by a mutual control mechanism such as a hydraulic pressure. This may be achieved in a number of ways which will be understood from the following description of the various embodiments of the disclosure.

The lubrication valve 4 in the rear axle drive 2 controls the lubricant level in first reservoir 6 or sump 6 of the drive 2 by controlling the flow from a side or second reservoir 7 to the first reservoir 6. Lubricant is brought from the first reservoir 6 to the second reservoir 7 by, means of the rotation of the gears of the drive 2 which are partially submerged in the lubricant in the first reservoir 6, thus flinging lubricant on the inside of the walls of the drive housing. The lubricant is then collected in the second reservoir 7. The lubricant valve 4 is controlled by movement of an actuating member 51, 54 of the AWD coupling 3. The actuating member may in one embodiment be a hydraulically actuated piston assembly 51 and in another embodiment be a valve slide 54 of the shut off valve 5 (see FIG. 4).

As can be seen, the AWD coupling 3 and the rear axle drive 2 are two separate components, however they together form the rear drive module 1. By controlling the lubricant valve 4 it possible to reduce the lubricant related churning losses by decreasing the lubricant level in first reservoir 6 of the rear axle drive 2 when less lubrication is needed (i.e. when no or only small amounts of torque is transferred). As the actuating member 51, 54 of the AWD coupling 3 controls the lubrication valve 4, thus controlling lubrication of the rear axle drive 2 there is no need for the rear axle drive 2 to be fitted with a separate actuator for the lubrication valve 4.

In one embodiment, the lubrication valve 4 in the rear axle drive 2 and the shut of valve 5 in the AWD coupling 3 are both actuated by a pressure in a hydraulic line in the AWD coupling 3 such that when the pressure rises, the shut off valve 5 and the lubrication valve 4 opens. The actuating member 51, 54 may as stated above be a hydraulically actuated piston assembly 51 connected to the hydraulic line, said piston 51 comprising a mechanical linkage 52 (such as a push rod) connected between the piston 51 and the valve slide 41 of the lubrication valve 4. The piston 51 is arranged in the AWD coupling 3, and is actuated by the hydraulic pressure which also governs the movements of the shut off valve 5, thus functionally connecting the lubrication valve 4 and the shut off valve 5. And since a disc package 13 of the AWD coupling 3 is actuated via a second piston 12 by the same pressure which indirectly actuates the lubrication valve 4 of the rear axle drive 2, the lubrication of the rear axle drive 2 is controlled in relation to the transferred torque through the rear drive module 1. As the shut off valve 5 may control provision of lubricant from a reservoir 14 of the AWD coupling 3 to the disc package 13, the lubrication of the entire rear drive module 1 is thus controlled by the AWD coupling 3.

The actuating member 51, 54 may be the valve slide 54 of the shut off valve 5, in which case the mechanical linkage 52 is connected between the valve slide 41 of the lubrication valve 4 and the valve slide 54 in the shut off valve 5 directly. The two valves 4, 5 are thus functionally connected in that opening movement of the shut off valve 5 forces the lubrication valve 4 to open via the mechanical linkage 52 and since the shut of valve 5 of the AWD coupling 3 may be pressure actuated, the above effect of controlling the lubrication of the rear axle drive 2 in relation to the transferred torque is also achieved. Other ways of functionally connecting the lubrication valve 4 and the shut off valve 5 are also possible, such as, hydraulic lines etc instead of a mechanical linkage 52. The shut off valve 5 of the AWD coupling 3 may also be actuated by other means in relation to the pressure, for instance electrically actuated in response to a detected pressure etc.

With regards to a specific embodiment, the AWD coupling 3 comprises a disc package 13 actuated by means of a second piston 12 received in a cylinder. The piston 12 has a piston rod. When the second piston 12 is actuated by means of hydraulic pressure, the discs of the disc package 13 will be urged towards each other and establish driving contact between the two shafts to which they are connected.

In this particular embodiment an electric actuator motor 8 drives an actuator pump 9 via a drive shaft, which also drives a centrifugal regulator 10. The position of the centrifugal regulator 10 controls the position of and flow through a pressure overflow valve 11 and the electric actuator motor 8 is controlled by the ECU.

Hydraulic oil for the hydraulic actuator system is contained in a reservoir. It is sucked into the pump through a hydraulic line and is delivered therefrom towards the cylinder through a main hydraulic line. Depending on the position of the centrifugal regulator 10 and thus the pressure overflow valve 11, a portion of and sometimes all of the hydraulic flow is diverted through a hydraulic line, through the overflow valve 11 and back to the reservoir. The result is that the hydraulic actuator pressure delivered to the cylinder is, governed by the centrifugal regulator 10.

By the provision of the pressure overflow valve 11, creating an overflow of excess oil back into the reservoir, the actuator motor 8 may be constantly running and will hereby have a very short reaction time to build up pressure in the system when needed, as it is already running, and thus less energy will be spent for accelerating rotating parts.

Under normal operation conditions, when there is no need to have the coupling 3 engaged, the actuator motor 8 is turned off or running at a rotational speed below that at which the pressure overflow valve 11 closes. When there is a demand for engaging the coupling 3, i.e. for actuating the second piston 12 and thereby transfer torque, through the coupling 3, a high current/voltage is supplied to the actuator motor 8 by the control unit (ECU). The speed of the drive shaft will go up, whereby the overflow valve 11 will be closed by the centrifugal regulator. Conversely, if the rotational speed of the motor drive shaft is lowered, the overflow valve 11 will be opened.

This system may be called a pump actuator system, as opposed to an accumulator system. In this system the controlled actuator pressure is created and delivered by a pump 9, whereas in an accumulator system the controlled actuator pressure is delivered from an accumulator charged by a pump.

When the FWD mode for the vehicle is to be accomplished, either at will by the driver or by software in the vehicle, the ECU controls the hydraulic pressure in the cylinder to be decreased, so that the AWD coupling 3 is disengaged. The illustrated AWD coupling 3 may in such embodiment be provided with a gravity lubrication system. For cooling and lubricating the disc package 13 of the coupling, hydraulic oil may be submitted by gravity from a hydraulic side reservoir 14 through a line during operation. By forces created by rotating parts in the coupling 3, the oil will be forced back to the side reservoir 14 through a hydraulic line. A shut-off valve 5 may be arranged in the line for cutting off the supply of oil through the line in the disengaged mode of the coupling 3 in order to reduce drag torque from the oil in the coupling.

This shut-off valve 5 of the AWD coupling 3, which may also be used for controlling the lubrication of an associated rear axle drive 2 as explained above and which will be further explained below, is in one embodiment operated by or in relation to the hydraulic pressure in the hydraulic line and by a return spring.

Figure 4:
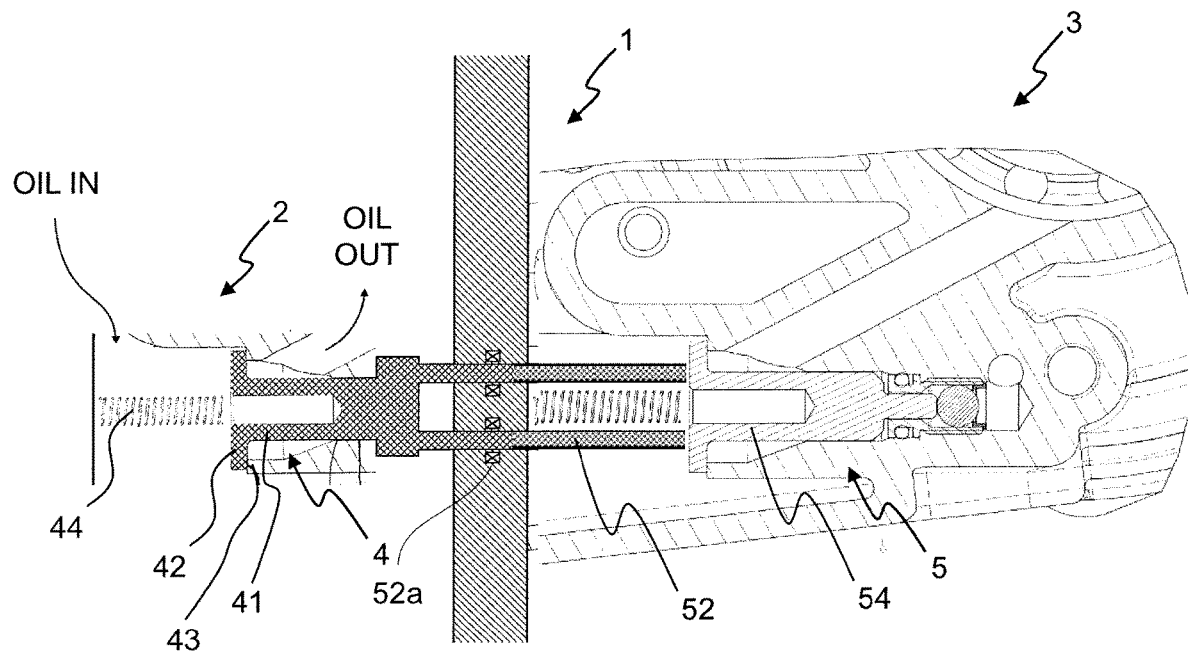
FIG. 4 shows a cross-sectioned view of a rear drive module 1 according to one embodiment.

Reference is onwards made simultaneously to FIGS. 3 and 4. FIG. 4 shows a cross sectioned view of a rear drive module 1 comprising the AWD coupling 3 and the rear axle drive 2. A housing compartment of the AWD coupling 3 is in contact with the side reservoir 14 (FIG. 3) and thus contains hydraulic oil. A bore connects the compartment with the disc package 13 for the supply of cooling and lubricating oil. The bore can be closed-off from the compartment by means of the shut-off valve 5.

The shut-off valve 5 of the AWD coupling 3 has a valve member in the form of a slide 54, axially movable in a valve bore in the housing. The slide has a transverse valve flange to be applied against a valve seat in the housing around the bore. The application force is provided by spring force, preferably by a compression spring supported by the housing.

The valve opening movement of the slide to the left in the drawing against the force of the spring is actuated by a ball. This ball is movably arranged in a ball cage, threadingly and sealingly received in the bore. The ball cage has a center hole for a control pin of the slide in contact with the ball. For keeping the ball within the ball cage, the latter is to the right in the drawing provided with a stop ring.

The ball has a slightly smaller diameter than the cross-sectional diameter, in the ball cage and is—when moving to the left in the drawing—applied against a ball seat in the ball cage. The movement of the ball to the left in the drawing is controlled by hydraulic pressure supplied through a housing bore, corresponding to the hydraulic line in FIG. 3.

In FIGS. 3 and 4, the shut-off valve of the AWD coupling is illustrated by a pressure actuated shut-off valve 5 for controlling provision of lubricant to the disc package 13 as described earlier which is beneficial since the lubricant related losses can thus be reduced in the entire rear drive module 1. However, the shut off valve 5 to which the lubrication valve 4 of the rear axle drive 2 is functionally connected may be actuated by other means, such as electrically or pneumatically, and control other functions of the AWD coupling as well.

The valve slide 54 of the shut-off valve 5 in the AWD coupling 3 as illustrated particularly in FIG. 4 moves in an opening direction through actuation by the hydraulic actuating pressure in the AWD coupling 3 and in a closing direction by means of spring force, thus moving in relation the transferred torque through the coupling 3. The valve slide 54 of the shut off valve 5 may however be electrically controlled or controlled by other means as well.

The lubrication valve 4 of the rear axle drive 2 is preferably moved in an opening direction by interaction with the actuating member 51, 54. The actuating member 51, 54 may be the valve slide 54 of the shut off valve 5 or a separate piston assembly 51 as shown in FIG. 3. Nevertheless, the actuating member 51, 54 is configured to control the lubrication valve 4 to be functionally connected to the shut off valve 5 of the AWD coupling 3 which means that the two valves 4, 5 are both controlled by the AWD coupling 3. The lubrication valve 4 of the rear axle drive 2 may be connected to the actuating member 51, 54 of the AWD coupling by means of a mechanical linkage; however the connection could equally well be a hydraulic connection or other connection types suitable for transferring movement from one component to another. Importantly, the lubrication valve 4 of the rear axle drive 2 needs no dedicated control, since actuation of the actuating member 51, 54 by the AWD coupling 3 will actuate the lubrication valve 4 as well.

Since the lubrication valve 4 of the rear axle drive 2 is controlled in relation to the transferred torque through the AWD coupling 3 and through the rear axle drive 2 to the rear wheels of the vehicle, the lubrication is improved over prior art not only due to constructional simplicity and design flexibility. When no torque is being transferred, the level of lubricant is lowered in the rear axle drive 2, reducing churning losses and improving efficiency of the drive line. As the AWD coupling 3 is connected, thus transferring torque through the rear axle drive 2, lubrication is also increased in the rear axle drive 3 by the lubrication valve 4. The need for a separate actuator for controlling the lubrication of the rear axle drive 2 can thus be removed and the integration of the components in the rear drive module 1 (i.e. the AWD coupling 3 and the rear axle drive 2) is improved, also when these two devices comes as two separate components.

Furthermore, as can be seen in FIG. 4, the lubrication valve 4 of the rear axle drive comprises an axially movable valve slide 41 provided with a transverse valve flange 42 for cooperation with a fixed valve seat 43, the slide being actuatable in a closing direction by spring force and in an opening direction by a force from the actuating member 51, 54 of the AWD coupling 3. As the valve slide 41 moves in, an opening direction the transverse valve flange 42 separates from the fixed valve seat 43 and lubricant can flow into a bore and onwards, providing lubrication to the components of the rear axle drive 2 such as the bearings and gears.

The valve slide 41 of the lubrication valve 4 may further comprise the mechanical linkage 52, for instance at least one push rod or similar, which extends such that an end of the linkage is adjacent or connected to the actuating member 51, 54 of the AWD coupling 3. The mechanical linkage 52 may also be a part of the actuating member 51, 54 of the AWD coupling 3 extending from the AWD coupling such that an end of the linkage 52 is adjacent or connected to the valve slide 41 of the lubrication valve 4 in the rear axle drive 2.

As is shown, the mechanical linkage 52 extends through a wall separating the rear axle drive 2 from the AWD coupling 3. Bushings and/or seals 52*a* may be provided around the linkage 52 in and/or on the wall to prevent leaks and to reduce friction when the mechanical linkage 52 moves reciprocally through the wall. Alternatively or in combination, a resilient membrane 53 may be arranged in the separating wall which is attached to the wall and to the linkage 52. As the membrane 53 is resilient, it allows movement (typically 2-4 mm) of the linkage 52 and provides a sealed connection between the wall and the linkage 52.

A spring 44 may be provided in the rear axle drive 2 for closing movement of the valve slide 41 of the lubrication valve 4, which closes when the spring force overpowers the force from the actuating member 51, 54 of the AWD coupling 3 i.e. when no or only small amounts of torque is being transferred through the AWD coupling 3.

In an embodiment where the actuating member 51, 54 is a valve slide 54 of the shut off valve 5 of the AWD coupling 3 and as the shut-off valve 5 of the AWD coupling 3 moves in an opening direction, the valve slide 54 will apply a force on the valve slide 41 of the lubrication valve 4 of the rear axle drive 2. The valve of the AWD coupling 3 may, as stated earlier, be actuated by the hydraulic pressure generated to compress the disc package 13 in the AWD coupling 3, thus is the movement of the lubrication valve 4 in the rear axle drive 2 actuated in relation the transferred torque through the AWD coupling 3.

Furthermore, the shut-off valve 5 of the AWD coupling 3 may, as stated earlier, control the provision of lubricant from a lubricant reservoir 14 of the AWD coupling 3 to a disc package 13 of the AWD coupling 3. As the control unit controls the pressure in the AWD coupling 3 and thereby the valve 5 of the AWD coupling 3, it will indirectly also regulate the provision lubricant to the disc package 13 of the AWD coupling 3 and control lubrication of the rear axle drive 2.

As the lubrication valve 4 opens, provision of lubricant to components in the rear axle drive 2 increases by the lubrication valve 4 allowing an increase in flow of lubricant from a second lubricant reservoir 7 in the housing of the drive 2 to a first reservoir 6 in which at least one gear of the drive 2 is at least partially submerged. Thus is the lubricant level in the two reservoirs 6, 7 controlled. In an embodiment, the first reservoir 6 may be e.g. a sump in the rear axle drive 2 and the second reservoir 7 is connected the first reservoir 6 via at least one hydraulic line (such as a bore), preferably by several lines of which the flow of lubricant in one of the lines is regulated by the lubricant valve 4. Only the lubricant of the first reservoir 6 is in direct contact with the gears of the rear axle drive 2, while the second reservoir 7 collects at least apart of the lubricant which is flung from the gears of the rear axle drive 2.

Figure 5:
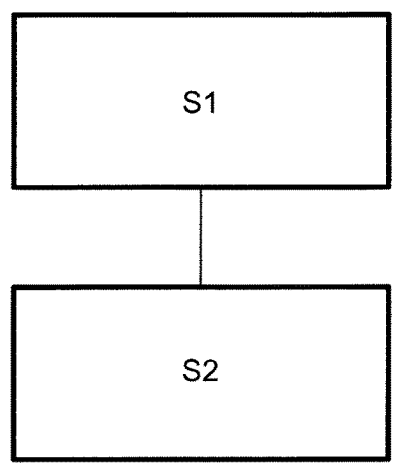
FIG. 5 shows a flowchart of a method according to one embodiment.

Turning to FIG. 5, a method for controlling the lubrication of a rear axle drive 2 is shown. The rear axle drive 2 comprises a lubrication valve 4 for controlling the level of lubricant in at least one lubricant reservoir 6, 7 of the rear axle drive 2 for providing lubricant to gears and/or bearings of the rear axle drive 2. The method comprises (i) providing an AWD coupling configured to control torque transfer through the rear axle drive. The AWD coupling comprises a shut-off valve for supplying cooling and lubricating oil to a disc package of the AWD coupling. The method further comprises (ii) connecting the lubrication valve 4 of the rear axle drive 2 to an actuating member 51, 54 of the AWD coupling 3 such that the supply of lubricant in the rear axle drive 2 is controlled in response to movement of the actuating member 51, 54 thus functionally connecting the lubrication valve 4 to a shut-off valve 5 of the AWD coupling 3. Thus may the lubrication in the rear axle drive 2 be controlled in relation to the movement of the actuating member 51, 54, which is preferably controlled to move in relation to the transferred torque through the AWD coupling 3.

The actuating member 51 of the AWD coupling 3 is configured to move in relation the transferred torque by the AWD coupling 3, whereby the method further comprises controlling the lubrication valve 4 of the rear axle drive 2 to provide lubrication in relation to the torque being transferred by the AWD coupling 3. The increasing and decreasing of the lubrication of the rear axle drive 2 in relation to transferred torque by the AWD coupling 3 provides integration of the AWD coupling and the rear axle drive 2, thus improving over prior art. As the AWD coupling 3 transfers torque, the rear axle drive 2 will be provided with increased lubrication and vice versa. Furthermore, the need for a separate actuator for controlling the provision of lubricant in the rear axle drive is removed.

It should be mentioned that the improved concept is by no means limited to the embodiments described herein, and several modifications are feasible without departing from the scope of the appended claims.

The invention claimed is:

1. Rear axle drive (2) for an AWD vehicle, the rear axle drive (2) being connected to an hydraulic AWD coupling (3), wherein the rear axle drive (2) comprises a lubrication valve (4) for controlling the level of lubricant in at least one lubricant reservoir (6, 7) of the rear axle drive (2) for providing lubricant to gears and/or bearings of the rear axle drive (2), wherein the lubrication valve (4) is functionally connected to a shut-off valve (5) of the AWD coupling (3) and wherein the lubrication valve (4) of the rear axle drive (3) is controlled by movement of an actuating member (51, 54) of the AWD coupling (3).

2. The rear axle drive (2) according to claim 1, wherein an axially movable valve slide (41) of the lubrication valve (4) is provided with a transverse valve flange (42) for cooperation with a fixed valve seat (43), the slide (41) being actuatable in a closing direction by spring force and in an opening direction by a force generated by movement of the actuating member (51, 54) of the AWD coupling (3).

3. The rear axle drive according to claim 1, wherein the lubrication valve (4) of the rear axle drive (2) is connected to the actuating member (51, 54) of the AWD coupling (3) by means of a mechanical linkage (52).

4. The AWD coupling (3) according to claim 1, wherein the valve slide (54) of the shut-off valve (5) is provided with a transverse valve flange for cooperation with a fixed valve seat, the slide being actuatable in a closing direction by spring force and in an opening direction by a hydraulically operated ball, having an actuation end position in a sealing ball seat.

5. The AWD coupling (3) according to claim 4, wherein the valve slide (54) has a control pin for engagement with the ball.

6. The AWD coupling (3) according to claim 4, wherein a compression spring is arranged to act on the valve slide (54) in its axial direction.

7. The AWD coupling (3) according to claim 6, wherein the ball seat is arranged in a ball cage, threadingly engaged in a housing bore, in which the valve slide (54) is arranged.

8. The AWD coupling (3) according to claim 6, wherein the control pin extends into the ball cage.

9. The AWD coupling (3) according to claim 8, wherein the ball cage is provided with a stop ring for holding the ball in the ball cage.

10. The AWD coupling (3) according to claim 9, wherein the ball opposite the control pin can be acted on by hydraulic pressure supplied through a housing bore.

11. A hydraulic AWD coupling (3), configured to control torque transfer through an associated rear axle drive (2), said AWD coupling (3) having a shut-off valve (5), wherein the shut-off valve (5) is functionally connected to a lubrication valve (4) of the rear axle drive (2), said lubrication valve (4) being provided for controlling the level of lubricant in at least one lubricant reservoir (6, 7) of the rear axle drive (2) and for providing lubricant to gears and/or bearings of the rear axle drive (2), and where the lubrication of the rear axle drive (2) is controlled by movement of an actuating member (51, 54) of the AWD coupling.

12. The AWD coupling (3) according to claim 11, wherein the actuating member (51, 54) is a pressure actuated piston (51) which is actuated by a hydraulic pressure in the AWD coupling (3) applied for actuating the disc package (13) and the shut off valve (5) of the AWD coupling (3), said hydraulic pressure being controlled by a control unit which controls a hydraulic pump (9) of the AWD coupling (3).

13. The AWD coupling (3) according to claim 11, wherein the actuating member (51, 54) is an axially moveable valve slide (54) of the shut off valve (5) of the AWD coupling (3) and wherein opening movement of the valve slide (54) of the shut off valve results in opening of the lubrication valve (4).

14. The AWD coupling (3) according to claim 13, wherein an opening movement of the shut-off valve (5) of the AWD coupling (3) is actuated by a hydraulic pressure of the AWD coupling (3) applied for actuating a disc package (13) of the AWD coupling (3), said opening movement being controlled by a control unit which controls a hydraulic pump (9) of the AWD coupling (3), and wherein a closing movement is actuated by spring force.

15. The AWD coupling (3) according to claim 11, wherein the shut-off valve (5) of the AWD coupling (3) controls the provision of lubricant from a lubricant reservoir (14) of the AWD coupling (3) to a disc package (13) of the AWD coupling (3).

16. A rear drive module (1) configured to distribute torque to the rear wheels of a vehicle, said rear drive module (1) comprising a rear axle drive (2) for an AWD vehicle, the rear axle drive (2) being connected to an hydraulic AWD coupling (3), wherein the rear axle drive (2) comprises a lubrication valve (4) for controlling the level of lubricant in at least one lubricant reservoir (6, 7) of the rear axle drive (2) for providing lubricant to gears and/or bearings of the rear axle drive (2), wherein the lubrication valve (4) is functionally connected to a shut-off valve (5) of the AWD coupling (3) and wherein the lubrication valve (4) of the rear axle drive (3) is controlled by movement of an actuating member (51, 54) of the AWD coupling (3).

17. The rear drive module (1) according to claim 16, wherein the rear axle drive (2) and the AWD coupling (3) are physically separated by a housing wall and wherein the mechanical linkage (52) stretches between the rear axle drive (2) and the AWD coupling (3) through a resilient membrane (53) arranged in the said housing wall.

18. A rear drive module according to claim 16 and further comprising a thereto connected AWD coupling (3)), configured to control torque transfer through an associated rear axle drive (2), said AWD coupling (3) having a shut-off valve (5), wherein the shut-off valve (5) is functionally connected to a lubrication valve (4) of the rear axle drive (2), said lubrication valve (4) being provided for controlling the level of lubricant in at least one lubricant reservoir (6, 7) of the rear axle drive (2) and for providing lubricant to gears and/or bearings of the rear axle drive (2), and where the lubrication of the rear axle drive (2) is controlled by movement of an actuating member (51, 54) of the AWD coupling, wherein the actuating member (51, 54) is a pressure actuated piston (51) which is actuated by a hydraulic pressure in the AWD coupling (3) applied for actuating the disc package (13) and the shut off valve (5) of the AWD coupling (3), said hydraulic pressure being controlled by a control unit which controls a hydraulic pump (9) of the AWD coupling (3).

19. A method for controlling the lubrication of a rear axle drive (2), wherein the rear axle drive (2) comprises a lubrication valve (4) for controlling the level of lubricant in at least one lubricant reservoir (6, 7) of the rear axle drive (2) for providing lubricant to gears and/or bearings of the rear axle drive (2), the method comprising:
providing an AWD coupling (3) configured to control torque transfer through the rear axle drive (2), said AWD coupling (3) having a shut-off valve (5), and
connecting the lubrication valve (4) of the rear axle drive (2) to an actuating member (51, 54) of the AWD coupling (3) such that the supply of lubricant in the rear axle drive (2) is controlled in response to movement of the actuating member (51, 54) thus functionally connecting the lubrication valve (4) to a shut-off valve (5) of the AWD coupling (3).

20. The method according to claim 17, wherein the actuating member (51, 54) of the AWD coupling (3) is configured to move in relation the transferred torque by the AWD coupling (3) wherein the method further comprises controlling the lubrication valve (4) of the rear axle drive (2) to provide lubrication in relation to the torque being transferred by the AWD coupling (3).

* * * * *